United States Patent [19] Bergmann et al.

[11] 4,048,150

[45] Sept. 13, 1977

[54] LEADER OF A CARRIER OF INFORMATION IN THE FORM OF A WEB

[75] Inventors: Rolf Bergmann, Wiesbaden-Schierstein; Klaus Hoheisel, Wiesbaden-Biebrich; Helmut Schafer, Russelsheim; Manfred Unger, Schlangenbad, all of Germany

[73] Assignee: Hoechst Aktiengesellschaft, Germany

[21] Appl. No.: 640,774

[22] Filed: Dec. 15, 1975

[30] Foreign Application Priority Data

Dec. 16, 1974 Germany ........................ 7441800[U]

[51] Int. Cl.[2] ................................................ G11B 5/78

[52] U.S. Cl. .................................. 260/75 T; 8/1 XA; 8/4; 242/188; 242/192; 264/210 R; 264/211; 264/289; 360/134; 427/129

[58] Field of Search ........... 264/210 R, 289 R, 176 R, 264/211, 349; 156/73.1; 260/75 T, 40 R; 8/1 XA, 4; 360/134; 242/192, 195, 188; 353/DIG. 3

[56] References Cited

U.S. PATENT DOCUMENTS

| | | | |
|---|---|---|---|
| 2,823,421 | 2/1958 | Scarlett | 264/289 |
| 2,995,779 | 8/1961 | Winter | 264/210 R |
| 3,382,206 | 5/1968 | Karickhoff | 260/40 R |
| 3,520,846 | 7/1970 | England | 260/40 R |
| 3,669,931 | 6/1972 | Annis et al. | 260/40 R |
| 3,821,156 | 6/1974 | Farrar | 260/40 R |
| 3,884,870 | 5/1975 | Dodson et al. | 260/40 R |
| 3,923,726 | 12/1975 | Benz | 264/176 R |

*Primary Examiner*—Jeffery R. Thurlow
*Attorney, Agent, or Firm*—James E. Bryan

[57] ABSTRACT

This invention relates to a leader of an information carrier web suitable for photoelectric control, comprising a polyester film oriented by biaxial stretching, having one layer, and a transparency of at least 60 per cent when exposed to light of a wavelength of 750 nm.

3 Claims, No Drawings

LEADER OF A CARRIER OF INFORMATION IN THE FORM OF A WEB

The present invention relates to a leader of a carrier of information in the form of a web which makes possible a photoelectric control of the information carrier web, which is especially a known magnetic tape, for example a tape in an audiocassette.

Transparent leaders are known which permit a photoelectric stopping of the running carrier web of information, e.g. a magnetic tape, in the following manner: When a magnetic tape is unreeled and has reached its end, its leader passes a photoelectric cell which receives an optical signal because of the transparency of the leader. Thus the running tape is switched off.

The known leaders have two layers and are composed of a support film of polyester and a layer of dye distributed in a binder. The dyes differ according to the lengths of the magnetic tapes.

These known two-layer leaders, however, have various disadvantages. Usually there is the danger that the leader, which is dried after the application of the dye distributed in the solution or dispersion of binder, is provided with a permanent tendency towards curling, due to the effect of the solvent or dispersion agent.

Another disadvantage is the poor adherence of the dye-containing binder to the surface of the film. When the leader slides past the recording head, the dye and the binder are partly worn off. They deposit on the sensitive recording heads, thus impairing the quality of the playback. Furthermore, the effect of heat may cause adjacent windings of the known leaders to adhere to each other and thus lead to improper running of the tape. This may occur, for example, when these compact cassettes are kept in automobiles and exposed to the sun.

Thus, it is the object of the invention to produce a leader sufficiently transparent for its purpose which does not have the disadvantages of the known leaders, but has the advantage that it can be wound and stored, since adjacent windings do not adhere to each other.

According to the invenion, this object is achieved by a leader composed of a polyester film oriented by biaxial stretching. It has one layer and a transparency of at least 60 percent if exposed to light having a wavelength of 750 nm. The transparency is defined as the ratio between the light intensities of this wavelength, measured with and without a sample of the leader, by means of an optical measuring system according to DIN 53 490.

The transparency of the leader according to the invention guarantees that the energy of the penetrating light is sufficient to cause a signal sufficiently strong to start the photoelectric current.

In the production of the leader, the polyester raw material, which must not be too turbid, is dyed with a dye having a sufficiently low light absorption, if necessary in the form of a masterbatch. The following production of a film must be such that the resulting film is not too turbid. The dye used also must be sufficiently heat-resistant so that no decomposition products causing turbidity can occur during the drying, extrusion and stretching etc. usually carried out after the dyeing. The dye, in the form of a masterbatch if necessary, may also be added during and/or after extrusion of the polyester material.

The film is preferably oriented by stretching it in such a manner that it has a greater stength in its longitudinal direction than in its transverse direction, the longitudinal direction of the film being identical with the direction of travel of the leaders.

The following examples further illustrate the invention:

EXAMPLE 1

161 kg of polyester chips were mixed with 21.8 kg of a masterbatch of polyester and 0.8 percent by weight of anthraceno (2,1-m; 1,9 a-n; 9a, 9-a) thioxanthene, and, after drying, the mixture of granulates was passed to an extruder and extruded through a slot die in known manner. After quenching the preliminary film, which had a thickness of 300 $\mu$m, it was biaxially stretched and then heat-set. The transparency of the red film, having a thickness of 30 $\mu$m, was 88 percent when exposed to light having a wavelength of 750 nm.

EXAMPLE 2

50 kg of dried and still hot polyester chips were drum-colored with 0.03 kg of Cu-phthalocyanine (color Index No. 74,160) and the film was produced as described above. The transparency of the film, having a thickness of 30 $\mu$m, was 88 percent when exposed to light having a wavelength of 750 nm.

EXAMPLE 3

198.8 kg of dried and still hot polyester chips were drum-colored with 1.2 kg, corresponding to 0.6 percent by weight, of the dye N-(n-octadecyl)-benzo(k,1) thioxanthene-3,4-dicarboximide. The transparency of the yellow film, having a thickness of 30 $\mu$m, was 87 percent when exposed to light having a wavelength of 750 nm.

The films produced in the examples given above could be easily wound and stored. Under exposure to heat, adjacent windings did not adhere to each other.

Furthermore, leaders produced from these films have the advantage that they can be easily heat-sealed with the information carrier webs using resorcin or benzyl alcohol and can be easily welded by means of ultrasound. If adhesive tape is used, the adhesive agent causes no adverse change of the surface of the leader.

It will be obvious to those skilled in the art that many modifications may be made within the scope of the present invention without departing from the spirit thereof, and the invention includes all such modifications.

What is claimed is:

1. A leader of an information carrier web suitable for photoelectric control, comprising a polyester film oriented by biaxial stretching having a greater strength in the machine direction than in the transverse direction and being internally colored with an organic dye which is sufficiently heat-resistant and which has a sufficiently low light absorption said leader having one layer and a transparency of at least 60 percent when exposed to light of a wavelength of 750 nm.

2. A leader according to claim 1 composed of a polyester film produced by extruding a polyester raw material containing a heat-resistant organic dye having a sufficiently low light absorption, quenching the preliminary film, biaxially stretching, and finally heat-setting the film.

3. A leader according to claim 1 composed of a polyethylene terephthalate film.

* * * * *